Patented July 12, 1938

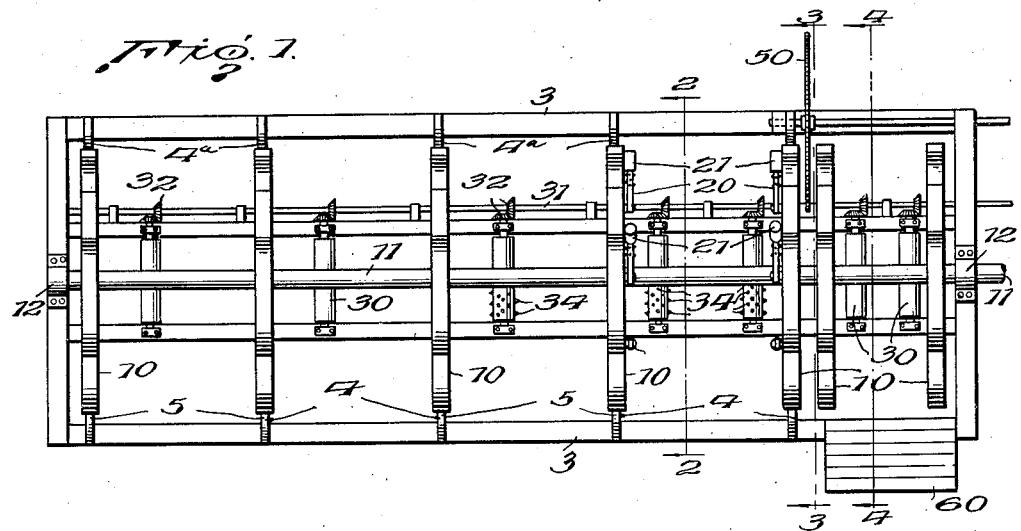
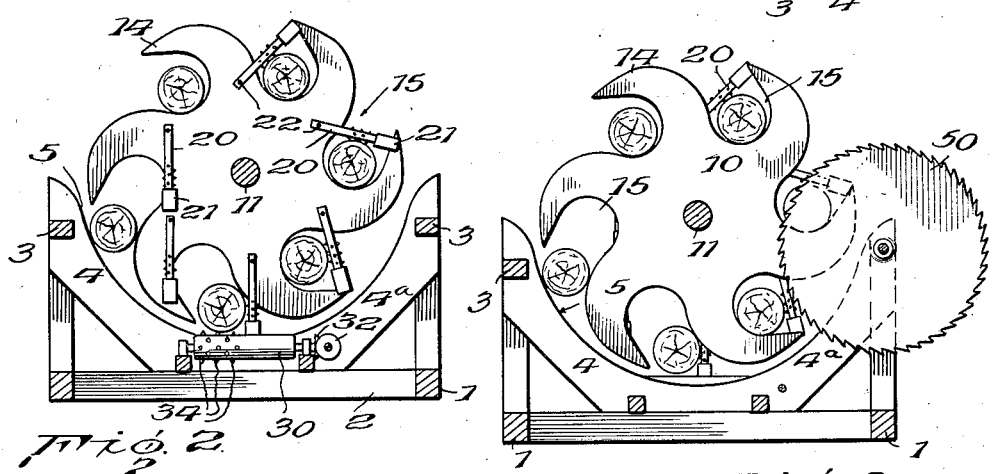
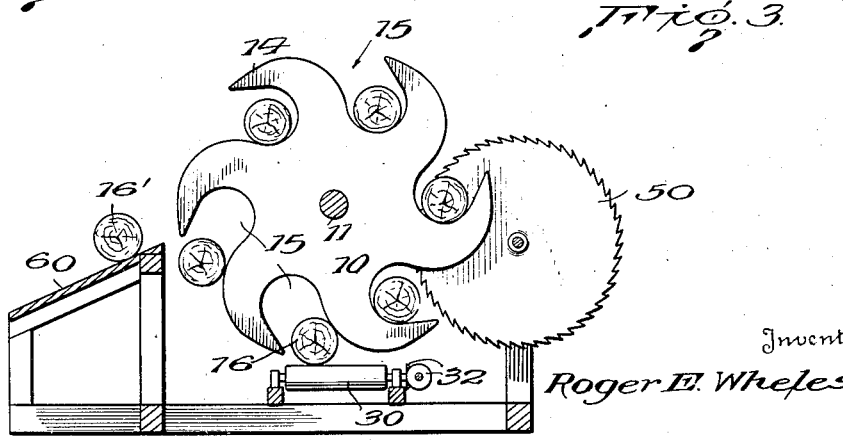

2,123,580

UNITED STATES PATENT OFFICE 2,123,580

LOG-CUTTING APPARATUS

Roger E. Wheless, Shreveport, La.

Application February 13, 1937, Serial No. 125,661

7 Claims. (Cl. 143—57)

This invention relates to wood-sawing devices and particularly to an apparatus for severing logs into sections of predetermined length.

The present apparatus is especially designed for use in the pulpwood industry, where logs running from four to about fifteen inches in diameter are cut into suitable lengths, usually four to six feet, before being taken to the mill.

One object of the invention is to provide an apparatus of the type indicated which is of comparatively simple construction; can be erected rather inexpensively; and which is sturdy and durable notwithstanding the strains placed upon it by the comparatively heavy material on which it is designed to operate.

Another object is to provide a simple, but efficient, mechanism for imparting a longitudinal movement to each log after a length has been severed therefrom by the saw, thus feeding the logs lengthwise to the saw.

A still further object of the invention is the provision of means for securely holding the log while it is sawed, such holding means being releasable by gravity to free the log and permit it to engage and be acted upon by the feeding means previously mentioned.

With these and other objects in view, the invention consists in certain details of construction and combinations and arrangements of parts, all as will hereinafter be more fully described, and the novel features thereof particularly pointed out in the appended claims.

In the accompanying drawing—

Figure 1 is a top plan view of a log-sawing machine illustrating the preferred embodiment of the present invention;

Fig. 2 is a vertical sectional view on the line 2—2 of Fig. 1;

Fig. 3 is a similar view on the line 3—3 of Fig. 1; and

Fig. 4 is a like view on the line 4—4 of Fig. 1.

The machine comprises a frame consisting preferably of sills 1, braced by any desired number of cross members 2 and sides 3. The frame is also braced by guides 4, 4ª, described in greater detail hereinafter. Supported in bearings 12 in the end of the frame is a shaft 11 adapted to be driven from any suitable source of power (not shown) and mounted on said shaft is a series of vertically disposed, concentric members in the form of discs which may, for convenience, be termed "cradles". Each of these so-called cradles is formed with a plurality of recesses 15. These recesses curve inwardly from the periphery of the cradle in a direction opposite to the direction of rotation of the cradle, the inner portions of the recesses being substantially semicircular to better accommodate the logs which are, roughly, of cylindrical shape. The cradle material, between each two recesses is of hook-like formation, as shown at 14, the hooks pointing in the direction of rotation of the cradles. The curvature of the walls of the recesses is such that the logs will be retained therein during the major portion of a revolution of the cradle or until each recess comes to a point where it might be said to be inverted.

A suitable cutting instrument, for instance, a circular saw 50 is mounted in any suitable location for cutting off sections of the log of desired length, the length of the severed section corresponding to the distance between said saw and the adjacent end of the frame which serves as a stop for limiting the endwise feeding movement of the logs to be later described.

To hold each log firmly in the cradles while being sawed, arms or latches 20 are provided on one or more of the cradles. As shown in Fig. 2, an arm 20 is pivoted adjacent each recess of a cradle and consists of a cylindrical or bar portion pivoted at one end at 22 and provided at its opposite free end with a weight 21. As the recesses move upwardly, each arm, in succession, will swing by gravity to a position across the entrance of its recess and the weight of portion 21 is such as to hold the log firmly seated in the inner, semicircular extremity of its recess. However, as the continued rotation of the cradle brings each recess to its inverted position, the weight 21 will cause the arm to swing clear of the recess and thus release the log. The arms can be pivoted on bolts 23 preferably at a point somewhat in advance, radially, of the recess so that the pull of gravity upon the weighted portions 21 will act most effectively to force the logs and retain them firmly in the recesses.

Mounted on the side sills of the main frame and below the cradles 10 are a number of rollers 30 disposed transversely of shaft 11 and adapted to be driven from a shaft 31 through suitable gears 32. Any desired number of these rollers 30 are formed with peripheral projections or teeth 34, preferably designed to slightly penetrate the bark or surface of a log deposited thereon so that the log will be moved lengthwise toward the saw 50. This feeding movement of the log is limited by the end of the frame, so that each log, after a section is severed, will be advanced the length of the severed section before it again comes into engagement with the saw. Preferably teeth 34 are provided on a portion only, lengthwise, of rollers 30 and the advance of the logs is rather rapid, so that by the time the end of the log abuts the frame, the movement of the log transversely of the frame will have caused it to be supported on the plane surfaced portions of rollers 30. In this way, continued endwise pressure of the log end against the frame is eliminated. The guideway 4 aids in directing the free logs to the rollers 30 and the guides 4a tend to direct the advanced logs back into the recesses of the cradles.

A suitable skidway 60 may be provided for directing or conveying the severed sections or billets away from the machine.

The operation of this apparatus is as follows:

The apparatus may be transported by truck or dragged across the ground to some location in the forest convenient to the scene of operations of those engaged in chopping or felling the trees, and the logs are transported from the place where the trees have been cut down to this apparatus by any suitable means. The logs to be cut into the shorter lengths may be introduced into the apparatus in any desired manner, but usually they are introduced by rolling them down an inclined platform or skidway towards the apparatus, from which skidway they are released singly at the proper time to fit into empty recesses between the teeth in cradles 10, or they may be lifted into the apparatus one at a time directly from a truck or wagon driven up beside it.

The logs are introduced at the side opposite the saw 50 and roll or slide down the inner circumferential surfaces 5 of guide members 4, subject to retardation by the back side of preceding teeth 14 of cradles 10 until they reach the lower end of guide 4 and roll or slide upon the series of rollers 30. Teeth 34 on rollers 30 bite the bark of the log and propel it forward until the end strikes the end of the frame. By this time the log has usually been propelled sideways by cradle 10 beyond that portion of the roller 30 which contains the teeth 34, so that there will be slippage at the point of contact between the rollers and the log. This slippage actually takes place even though the log has not passed beyond the area or range of the teeth 34 because the softness of the bark of the pine trees used for pulp making in certain localities permits the teeth to tear through it. Nevertheless it is preferable to have the latter portion of the rollers with which the log comes in contact free from teeth.

As the rotation of the cradles 10 continues to carry the logs beyond the rollers 30, they are forced up upon the inner circumferential or arcuate surfaces 5 of guide members 4a until they reach a point where they will roll back into the recesses 15 between the teeth 14. The weighted arms 20 pivotally mounted to the cradles at point 23 which were clear of the recesses while the latter were inverted now swing to a position spanning the recesses into engagement with the log to press upon it, forcing it more firmly to a seat within the recesses 15 and holding it in a more stable position relative to the cradle when it comes in contact with the saw 50.

Continued rotation of the cradles forces the log against saw 50, cutting off of one end of it a section equal to the distance from saw 50 to the end of the frame 1, which usually for pulpwood is 4 ft. 6 in., as explained above.

Both portions of the log, that is, the shorter billet and the long remainder of the log are carried by the plurality of cradles to further rotation after having been severed by the saw. When they reach a point somewhat beyond top center the short billet 16' which has been carried by the two end cradles rolls forward along the back edge of the teeth 14 and falls out of the cradle from the side opposite the saw upon the skidway or inclined platform 60 down which it rolls to the ground or to a truck or wagon upon which it is loaded or to a loading platform from which it may be loaded upon a truck for transportation to the mill or to the railroad.

The remainder of the log 16 as illustrated in Fig. 3, shortly after it passes the top center also rolls down the back side of teeth 14 since by that time the weighted arms 20 have passed beyond their pivotal center have fallen away, rotating about that pivot to clear the recesses and free the log. It is, however, caught upon the upper end of guide members 4 and rolls or slides down the inner arcuate surfaces 5 retarded by the back side of teeth 14 until it reaches rollers 30 and is advanced endwise, as in the previous cycle. This operation is repeated, the log going round and round in the cradles and having a short billet cut off of it each cycle of rotation until it has all been cut up and has passed out of the apparatus along the skidway or inclined platform 60, leaving one series of recesses 15 vacant. A new log is then introduced into the apparatus to fill each series of recesses 15 in the series of cradles 10 as they become vacant.

This apparatus provides an efficient and quick means of bringing a number of logs in contact with a saw and of handling or withdrawing billets cut off thereby. On account of the plurality of teeth in each cradle, a plurality of logs may be handled therein bringing logs in contact with the saw in rapid succession and providing very rapid cutting, or very short intervals between cuts.

The apparatus may be modified to use a plurality of saws properly spaced without going beyond the scope of this invention. It is however considered preferable in the present instance and for the present purpose, that is, the cutting of pulpwood logs of length approximately 4 ft. 6 in. to use only one saw partly because it facilitates the removal of the finished or cut off billet, and partly because in cutting material of this nature which is not completely straight (and very few logs are entirely straight), better cutting action will be obtained with less tendency to pinch the saw if only one cut is being made at a time, and if the log is being held firmly against the propelling surfaces at a point adjacent the saw. For this reason the weight arms 20 are only provided upon those cradles adjacent to the saw so that in the event of curvature of the log which would prevent its being in proper seating contact in the recesses 15 upon all cradles throughout its entire length it will at least be held in seating contact upon those adjacent to the saw and will be held steady while the saw is cutting through.

While the present apparatus has been described as being especially adapted for use in connection with pulpwood, it is evident that it is not limited to this particular use.

What I claim is:

1. In a log-sawing machine, a series of alined rotatable members each having log-receiving recesses at its perimeter, a saw operatively associated with one of said members, means engaging logs in said recesses during a portion only of each revolution of said members to retain said logs in said recesses whereby each log is free to be displaced from said recesses during a portion of each revolution of the members, and means engageable with said logs successively as they are displaced from said recesses for advancing the same longitudinally of said members toward the saw.

2. In a log-sawing machine, a series of rotary, concentrically arranged members each having a plurality of recesses therein, the recesses of the several members being alined to receive the logs, a saw positioned to sever the logs at a predetermined distance from one end thereof, means engaging logs in said recesses during a portion only of each revolution of said members for retaining said logs in the recesses whereby each log is free to move out of said recesses during a portion of each revolution of said members, means below said members for engaging logs from successive recesses and advancing said logs longitudinally toward the saw when disengaged from said recesses, and means for returning said logs to said recesses.

3. In a log-sawing machine, a series of rotary, concentrically arranged members having alined log-receiving recesses, a saw positioned to engage a log in said recesses and sever the same a predetermined distance from one end thereof, means engaging logs in the recesses for fixedly retaining said logs in said recesses during a portion only of each revolution of said members, whereby each log is free to move out of said recesses by gravity during the remaining portion of each revolution, means for advancing successive logs longitudinally toward the saw while displaced from the recesses, and means for guiding the log into said recesses after it has been so advanced toward the saw.

4. In a log-sawing machine, a series of rotary, concentrically arranged members, log-retaining means engageable with logs in said recesses during a portion only of each revolution of said members to retain logs in said recesses, a saw for severing the log while retained in said members, each log being free to disengage itself by gravity from said members while the log-retaining means are disengaged, and means for imparting a longitudinal movement to the log while disengaged, and means for returning the displaced log into said members in advance of the point at which it is engaged by said saw.

5. In a log-sawing machine, a series of vertically disposed, concentrically arranged rotary members having log-receiving recesses therein, log-retaining arms movable by gravity to and from a position across the entrance of said recesses, the logs being successively displaced from the recesses by gravity when the arms are removed from the entrances of said recesses, means engageable by successively displaced logs for imparting a longitudinal movement to the logs while displaced from the recesses, means for returning the displaced logs to said recesses, and a saw for severing the logs in the recesses.

6. In a log-sawing machine, a series of vertically disposed rotary members having log-receiving recesses therein, log-retaining means movable into and out of a position transversely of the entrances of said recesses to retain logs in said recesses, the logs being free to move out of said recesses while said log-retaining means are out of position during a portion of each revolution of said members, a saw engageable with logs in said recesses, a plurality of feed rollers below said members for supporting the logs as they move out of said recesses, and means on said rollers for imparting a longitudinal movement to logs supported thereon.

7. In a log-sawing machine, a series of vertically disposed rotary members having log-receiving recesses therein, log-retaining means movable into and out of a position transversely of the entrances of said recesses to retain the logs in said recesses whereby the logs are free to move out of said recesses during a portion of each revolution of said members, while said retaining means are out of position, a saw engageable with logs in said recesses, a plurality of feed rollers below said members for supporting the logs as they move out of said recesses, said rollers being disposed transversely of the axis of said rotary members, and projections on the periphery of each roller for a portion of its length for imparting a longitudinal movement to logs supported thereon, the remainder of the periphery of each roller being smooth.

ROGER E. WHELESS.